United States Patent
Lee et al.

(10) Patent No.: US 12,080,502 B2
(45) Date of Patent: Sep. 3, 2024

(54) ENTRANCE AND EXIT POSITION DETECTION DEVICE FOR POWER DEVICE, AND ENTRANCE AND EXIT MONITORING SYSTEM INCLUDING SAME

(71) Applicant: LS ELECTRIC CO., LTD., Anyang-si (KR)

(72) Inventors: Sang-Chul Lee, Anyang-si (KR); Young Kim, Anyang-si (KR); Han-Baek Chung, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 115 days.

(21) Appl. No.: 17/916,710

(22) PCT Filed: Mar. 29, 2021

(86) PCT No.: PCT/KR2021/003871
§ 371 (c)(1),
(2) Date: Oct. 3, 2022

(87) PCT Pub. No.: WO2021/201537
PCT Pub. Date: Oct. 7, 2021

(65) Prior Publication Data
US 2023/0154711 A1   May 18, 2023

(30) Foreign Application Priority Data
Apr. 3, 2020   (KR) .................. 10-2020-0041144

(51) Int. Cl.
| | | |
|---|---|---|
| *H02B 11/127* | (2006.01) | |
| *H01H 9/16* | (2006.01) | |
| *H01H 71/04* | (2006.01) | |
| *H01H 71/52* | (2006.01) | |

(52) U.S. Cl.
CPC ............ *H01H 71/04* (2013.01); *H01H 9/161* (2013.01); *H01H 71/522* (2013.01); *H01H 2071/046* (2013.01)

(58) Field of Classification Search
CPC .......... H02B 11/133; H02B 1/04; H02B 1/30; H02B 11/10; H02B 11/127; H02B 11/173;
(Continued)

(56) References Cited

U.S. PATENT DOCUMENTS

| | | | |
|---|---|---|---|
| 10,090,120 B2 * | 10/2018 | Seo ........................ H01H 9/286 |
| 10,121,624 B2 * | 11/2018 | Kim ....................... H02B 11/10 |

(Continued)

FOREIGN PATENT DOCUMENTS

| | | |
|---|---|---|
| CN | 109861125 A | 6/2019 |
| DE | 4131819 A1 | 3/1993 |

(Continued)

OTHER PUBLICATIONS

Extended European Search Report for related European Application No. 21780262.8; action dated Aug. 10, 2023; (10 pages).

(Continued)

*Primary Examiner* — Ahmed M Saeed
(74) *Attorney, Agent, or Firm* — K&L Gates LLP

(57) ABSTRACT

The present disclosure provides an entrance and exit position detection device for a power device. The entrance and exit position detection device for a power device comprises: a cradle which is open on one side and has an arrangement space formed therein; a power device body which may be in the arrangement space and has a guide plate formed on one side portion thereof; and a position detection part which linearly detects the displaced position of the power device body while the cradle enters and exits the arrangement space. Also, the present disclosure provides an entrance and (Continued)

exit monitoring system which has the above-described entrance and exit position detection device for the power device.

9 Claims, 8 Drawing Sheets

(58) Field of Classification Search
CPC ...... H02B 11/26; H01H 71/0207; H01H 9/20; H01H 9/22; H01H 71/10; H01L 13/14; H01L 13/26
See application file for complete search history.

(56) References Cited

U.S. PATENT DOCUMENTS

| | | | |
|---|---|---|---|
| 2014/0114807 A1 | 4/2014 | Baker et al. | |
| 2016/0276812 A1* | 9/2016 | Fisher | H02B 1/34 |
| 2017/0237241 A1 | 8/2017 | Benke et al. | |
| 2018/0145487 A1 | 5/2018 | Kini et al. | |

FOREIGN PATENT DOCUMENTS

| | | |
|---|---|---|
| JP | H06215669 A | 8/1994 |
| JP | 2014033590 A | 2/2014 |
| KR | 200340100 Y1 | 1/2004 |
| KR | 101151940 B1 | 6/2012 |
| KR | 20130000281 A | 1/2013 |
| KR | 20180117457 A | 10/2018 |
| WO | 2017011536 A1 | 1/2017 |

OTHER PUBLICATIONS

International Search Report for related International Application No. PCT/KR2021/003871; action dated Oct. 7, 2021; (6 pages).
Written Opinion for related International Application No. PCT/KR2021/003871; action dated Oct. 7, 2021; (4 pages).

* cited by examiner

ENTRANCE AND EXIT POSITION DETECTION DEVICE FOR POWER DEVICE, AND ENTRANCE AND EXIT MONITORING SYSTEM INCLUDING SAME

CROSS-REFERENCE TO RELATED APPLICATION

The present application is a National Stage of International Application No. PCT/KR2021/003871 filed on Mar. 29, 2021, which claims priority to and the benefit of Korean Utility Model Application No. 10-2020-0041144, filed on Apr. 3, 2020, the disclosure of which is incorporated herein by reference in its entirety.

FIELD

The present disclosure relates to a device for detecting extended and retracted positions and a system for monitoring extending and retracting motions having the same. More specifically, the present disclosure relates to a device for detecting extended and retracted positions for a power device, the device being capable of linearly detecting extended and retracted positions of a circuit breaker body in a cradle, and a system for monitoring extending and retracting motions having the same.

BACKGROUND

A circuit breaker is a device that breaks a circuit when an abnormal or fault current occurs in an electric circuit, thereby protecting a load and a power source therefrom.

An air circuit breaker is a kind of a circuit breaker that cuts off current in event of opening and closing a load or an accident such as grounding or short circuit in transmission, a substation or an electric circuit, etc. The air circuit breaker is mainly used for a low voltage device.

The circuit breaker includes a cradle to facilitate inspection, use, or replacement of a circuit breaker body.

The circuit breaker may be classified into a fixed type circuit breaker in which the circuit breaker body is fixed to the cradle, and a drawable type circuit breaker in which the circuit breaker body is drawn into (retracts into) and drawn out of (extends from) the cradle.

In the drawable type circuit breaker, the circuit breaker body retracts into the cradle to conduct the current. In this drawn-in state, the circuit breaker performs insertion (on) and trip (off) operations. When fault current occurs in an electrical line while the circuit breaker is inserted (on), the circuit breaker cuts the fault current after a predefined time or immediately depending on a magnitude of the fault current.

FIG. 1 shows a configuration diagram of a conventional power device.

Referring to FIG. 1, a conventional power device 10 includes a circuit breaker body 13, a cradle 11 into which the circuit breaker body 13 moves, a handle receiving portion 15 into which a handle 17 is inserted, and the handle 17 which is inserted into the handle receiving portion 15, and then is rotated so that the circuit the circuit breaker body 13 moves to a disconnect position, a test position, a connect position, etc.

Therefore, when the handle 17 is inserted into the handle receiving portion 15 and is rotated while the circuit breaker body 13 is positioned inside the cradle 11, the circuit breaker body 13 is positioned at the disconnect position, the test position or the connect position in the cradle 11.

FIG. 2 is a front view showing a position display device provided in another conventional power device.

Referring to FIG. 2, the conventional power device includes a position display device 30. Accordingly, a position of the circuit breaker body is displayed externally on the position display device 30.

However, in the position display device 30 of the conventional power device, the handle receiving portion 33 is positioned above an indicator 31. Thus, when adjusting the position of the circuit breaker body 13 using the handle 17, the indicator 31 is hidden with the handle 17, so that it is difficult to accurately identify a current position of the circuit breaker body 13.

For this reason, a rotational motion of a worm wheel is converted into a linear motion to position the indicator above the handle receiving portion. However, in this case, the position of the circuit breaker body 13 may be identified only when the circuit breaker body 13 is at the disconnect position, the test position or the connect position within the cradle 11.

Accordingly, there is a problem in the prior art in that it is practically difficult to linearly detect the position of the body while the circuit breaker body is approaching the disconnect position, the test position, or the connect position in the cradle.

A prior literature related to the present disclosure includes a Korean patent No. 10-1151940.

Summary

A first purpose of the present disclosure is to provide a device for detecting extended and retracted positions for a power device, the device being capable of linearly detecting extended and retracted positions of a circuit breaker body in a cradle, and to provide a system for monitoring extending and retracting motions having the same.

Further, a second purpose of the present disclosure is to provide a device for detecting extended and retracted positions for a power device, the device being capable of detecting position information of a circuit breaker body while the circuit breaker body retracts into or extends from a cradle in real time, and to provide a system for monitoring extending and retracting motions having the same.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

The present disclosure provides a device for detecting extended and retracted positions for a power device.

The device for detecting extended and retracted positions for a power device includes a cradle having one open side, and having a placement space defend therein; a guide plate movably disposed in the placement space, wherein a power device body is seated on the guide plate; and a position detector configured to linearly detect a displaced position of the power device body while the power device body seated on the guide plate retracts into or extends from the cradle.

In this regard, a guide hole is defined in a side face of the cradle, wherein the guide hole has a predefined length and extends along a horizontal direction,
wherein the position detector includes:
a position detecting member attached to a predefined area of a side face of the cradle exposed to the guide hole, wherein the position detecting member has a reflective area, wherein an amount of light reflected from the reflective area varies along a longitudinal direction thereof; and
an optical sensor installed in the cradle so as to be disposed adjacent to the guide hole, wherein the optical sensor is configured to emit light to the reflective area of the position detecting member, and measure an amount of light reflected therefrom, and measure the displaced position of the power device body based on the measured amount.

Further, the reflective area is embodied as at least one of: a gradation sticker; or an inclined member having an inclined face gradually upwardly or downwardly inclined in a direction from one end to the other end of the reflective area.

Further, a curved hole having a preset curvature is defined in a side face of the cradle,
wherein a contact pin connected to a link disposed inside the cradle is positioned in the curved hole in a protruding manner therefrom,
and the contact pin is movable along the curved hole,
wherein the contact pin is displaced along the curved hole while the power device body retracts into or extends from the cradle,
wherein the position detector includes:
a position detecting member extending in a curved manner along a length direction of the curved hole and having a predetermined curvature, wherein the position detecting member is disposed in an area adjacent to the curved hole, and has a reflective area, wherein an amount of light reflected from the reflective area varies along a longitudinal direction thereof; and
an optical sensor installed on the contact pin, wherein the optical sensor is configured to emit light to the reflective area of the position detecting member, and measure an amount of light reflected therefrom, and measure the displaced position of the power device body based on the measured amount.

Further, the reflective area is embodied as at least one of: a gradation sticker; or an inclined member having an inclined face gradually upwardly or downwardly inclined in a direction from one end to the other end of the reflective area.

Another aspect of the present disclosure provides a system for monitoring extending and retracting motions, the system comprising: the device for detecting extended and retracted positions for the power device as described above; a storage for receiving the linearly-detected displaced position of the power device body from the position detector and storing the displaced position therein; a display for displaying the stored displaced position of the power device body to an outside; and a controller configured to control the display to display a preset position and the stored displaced position of the power device body in an overlapping manner with each other.

Technical Effects

Based on the above technical solutions, the device according to the present disclosure has an effect of linearly detecting the extended and retracted positions of the circuit breaker body in the cradle.

Further, the device and the system according to the present disclosure may be capable of detecting position information of the circuit breaker body while the circuit breaker body retracts into or extends from the cradle in real time, and may be capable of monitoring extending and retracting motions.

In addition to the above-described effects, specific effects of the present disclosure will be described together while describing specific details for carrying out the disclosure below.

DETAILED DESCRIPTION

Figure 1:
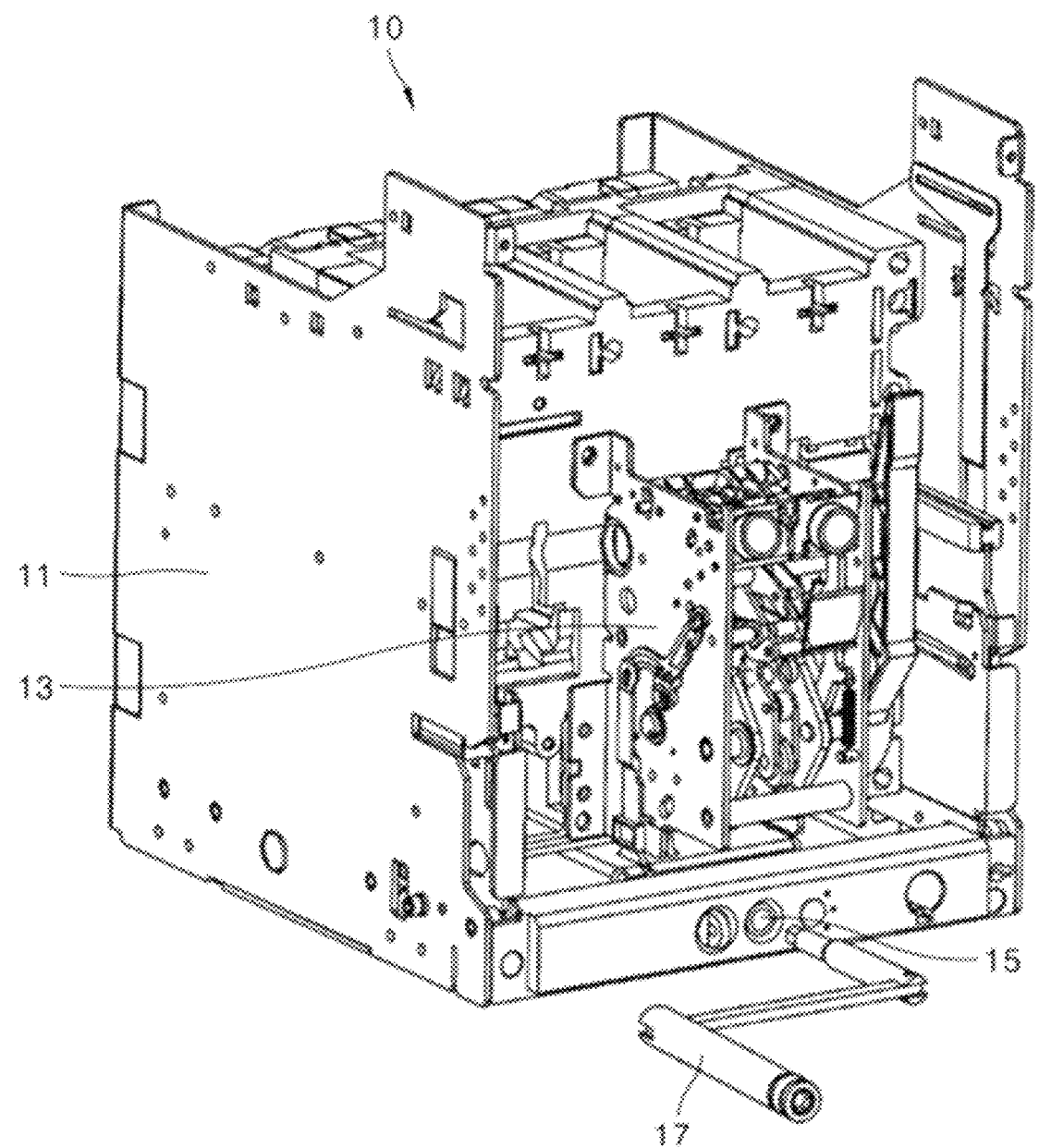
FIG. 1 is a diagram showing a configuration of a conventional power device.
Figure 2:
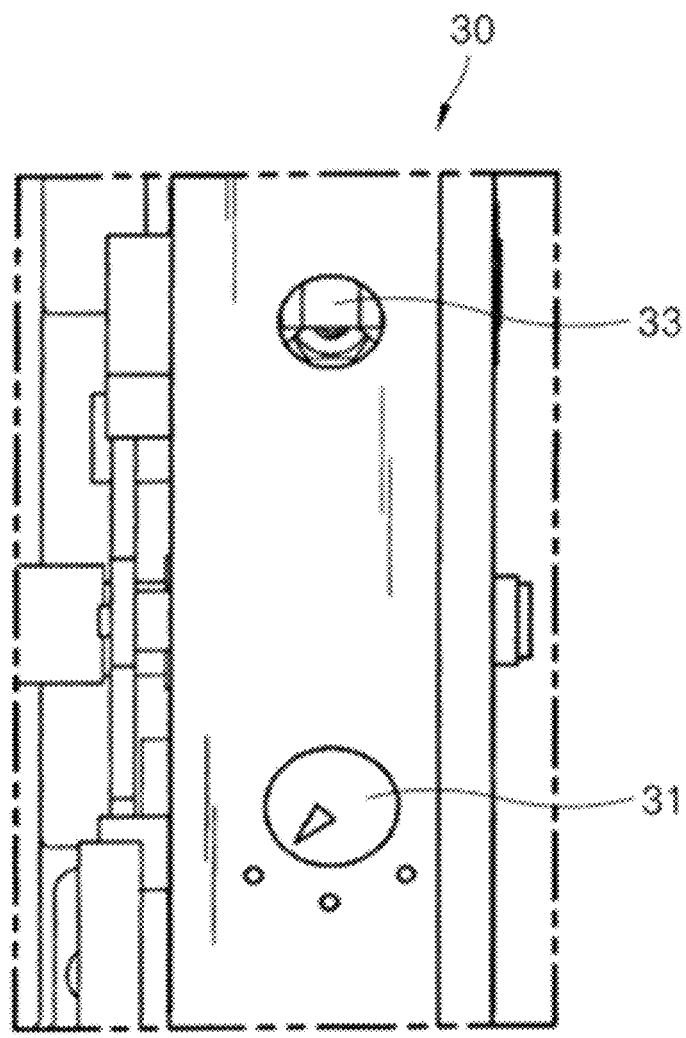
FIG. 2 is a front view showing a position display device provided in another conventional power device.

Hereinafter, with reference to the drawings, an embodiment of the present disclosure will be described in detail so that a person of ordinary skill in the art to which the present disclosure belongs may easily implement the present disclosure.

The present disclosure may be implemented in several different forms and is not limited to the embodiment as described herein.

In describing the present disclosure, when it is determined that a detailed description of a known component related to the present disclosure may unnecessarily obscure gist the present disclosure, the detailed description is omitted. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element.

It will also be understood that when a first element or layer is referred to as being present "on" or "beneath" a second element or layer, a third element or layer may be disposed between the first and second elements or layers.

Hereinafter, with reference to the accompanying drawings, a device for detecting extended and retracted positions for a power device according to the present disclosure and a system for monitoring extending and retracting motions having the same will be described.

Figure 3:
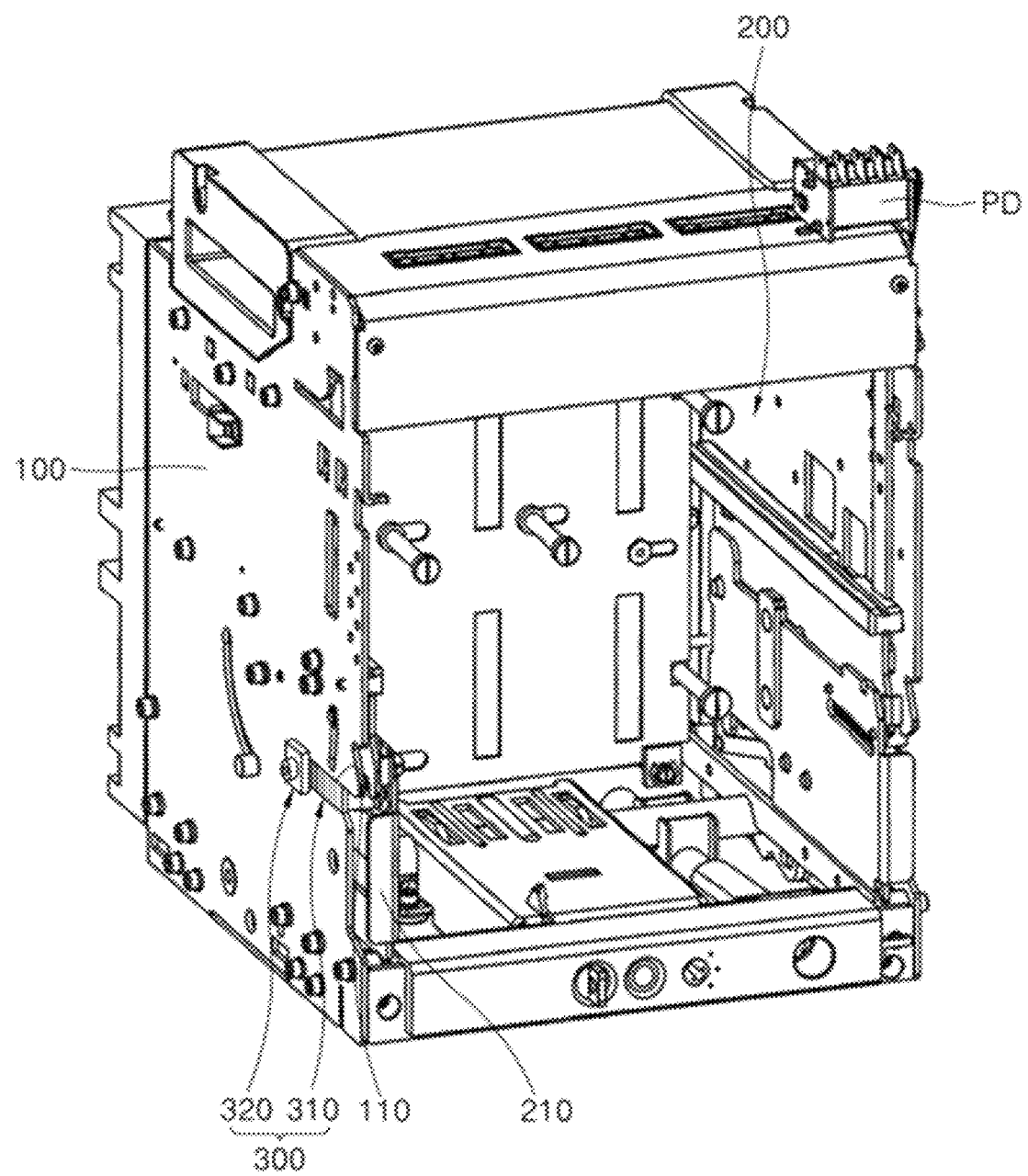
FIG. 3 is a perspective view showing a coupling relationship between a cradle and a circuit breaker body according to the present disclosure.
Figure 4:
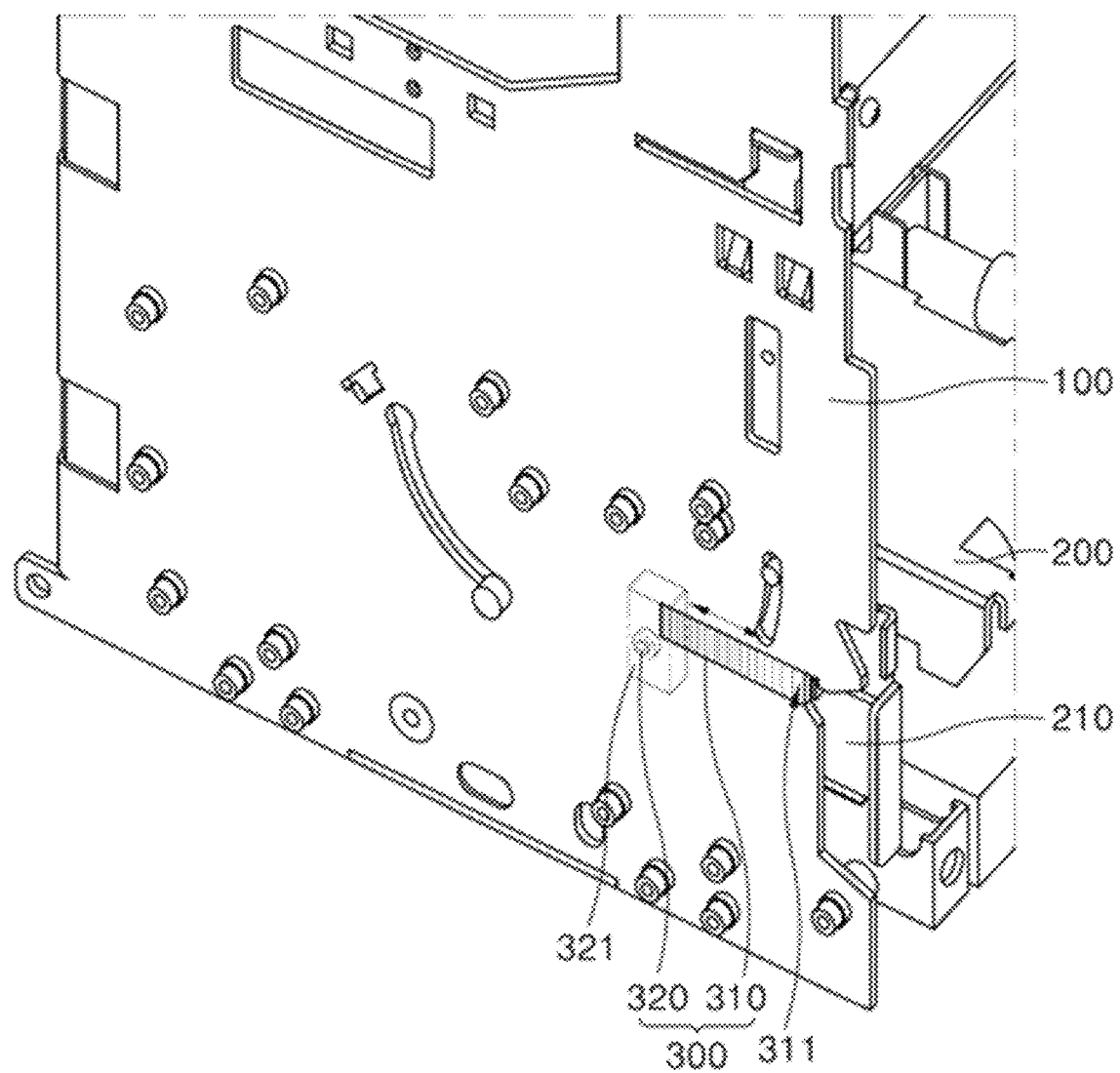
FIG. 4 is a perspective view showing a state in which the circuit breaker body is inserted into a receiving space of the cradle according to the present disclosure.
Figure 5:
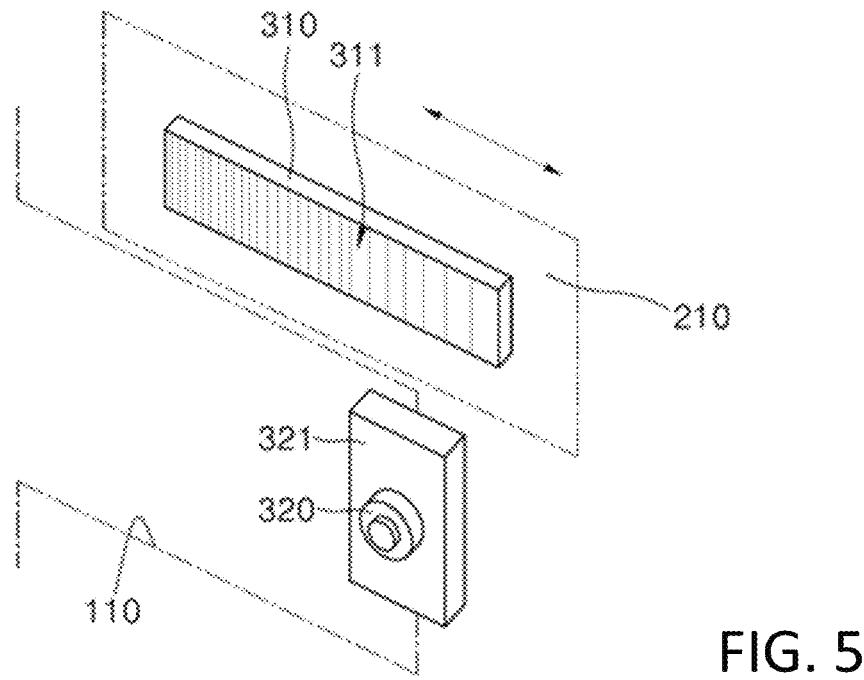
FIG. 5 is a diagram showing a first example of a position detecting member in an example of a position detector according to the present disclosure.
Figure 6:
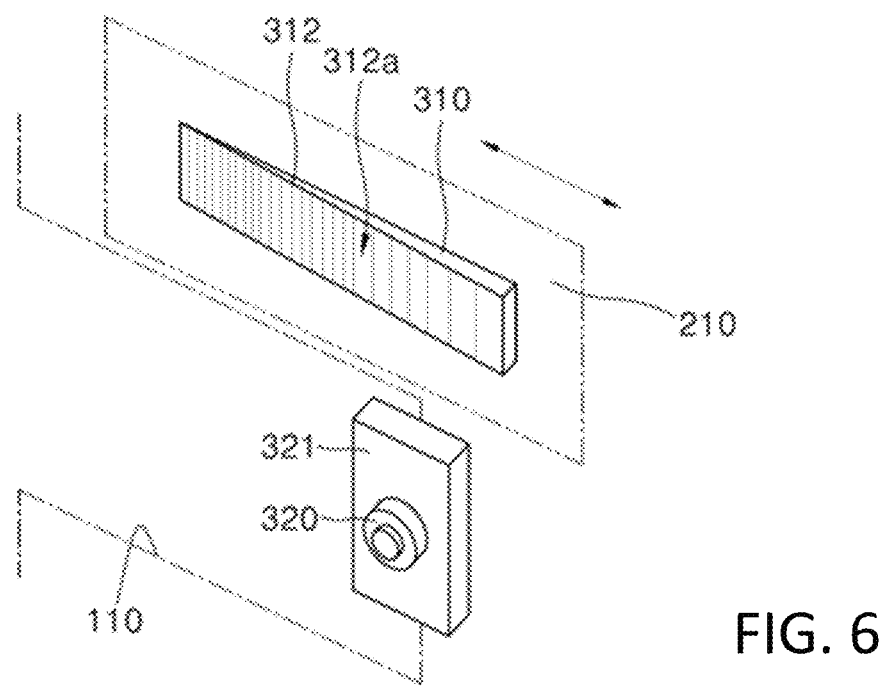
FIG. 6 is a diagram showing a second example of a position detecting member according to the present disclosure.

FIG. 3 is a perspective view showing a coupling relationship between a cradle and a circuit breaker body according to the present disclosure. FIG. 4 is a perspective view showing a state in which the circuit breaker body is inserted into a receiving space of the cradle according to the present disclosure. FIG. 5 is a diagram showing a first example of a position detecting member in an example of a position detector according to the present disclosure. FIG. 6 is a diagram showing a second example of a position detecting member according to the present disclosure.

Referring to FIG. 3, a device for detecting extended and retracted positions according to the present disclosure includes a cradle 100, a circuit breaker body 200, and a position detector 300.

A receiving space is defined inside the cradle 100 according to the present disclosure. A front face of the cradle 100 is open. The receiving space is a space into which the circuit breaker body 200 is introduced.

A disconnect position, a test position, or a connect position is preset in the receiving space, based on a position to which the circuit breaker body 200 moves. In this regard, a distance between adjacent ones of the disconnect position, the test position and the connect position is preset. This distance is referred to as a movement distance.

A guide plate 210 are disposed on each of both opposing sides of the cradle 100. The circuit breaker body 200 is seated on the cradle 100. The guide plate 210 is movably disposed in an placement space formed inside the cradle 100. Accordingly, since the circuit breaker body 100 is seated on the guide plate 210, movement of the guide plate 210 leads to movement of the circuit breaker body 100.

The guide plate 210 has a predefined length along a horizontal direction and a predefined width along a vertical direction.

Further, a guide hole 110 having a predefined length along the horizontal direction is cut and formed in each of both opposing walls of the cradle 100.

The length of the guide hole 110 may be equal to the above-described movement distance.

Further, an outer face of the guide plate 210 may be exposed to an outside through the guide hole 110.

Accordingly, a partial area of the outer face of the guide plate 210 is exposed to the outside through the guide hole 110.

In this regard, the partial area of the outer face of the guide plate 210 exposed through the guide hole 110 is referred to as an installation area.

The position detector 300 according to the present disclosure linearly detects a position in movement of the guide plate 210 while the guide plate 210 on which the circuit breaker body 200 is seated is drawn in and out of the placement space of the cradle 100.

The position detector 300 includes a position detecting member 310 and an optical sensor 320.

The position detecting member 310 is attached to the above-described installation area. The attachment scheme may include a coupling scheme using bolts or the like, and a scheme of attaching using an adhesive.

Referring to FIG. 5, the position detecting member 310 according to the present disclosure is attached to a predefined area of a side face of the guide plate 210 exposed to the guide hole 110. The position detecting member 310 has a reflective area 311 in which an amount of light as reflected varies along a longitudinal direction thereof.

The position detecting member 310 is attached to the installation area of the side face of the guide plate 210.

The optical sensor 320 is installed in the cradle 100 so as to be disposed in the vicinity of the guide hole 110, and emits light to the reflective area of the position detecting member 310 to measures an amount of light reflected therefrom and thus determine a displaced position of the circuit breaker body 200 based on the measured amount.

A bracket 321 is installed at a predefined position near the guide hole 110. The bracket 321 may be a member extending laterally from a predefined position in the vicinity of the guide hole 110 so as to be positioned at a position overlapping the guide hole 110. The optical sensor 320 is fixedly installed on the bracket 321 so as to be exposed to the guide hole 110.

In this regard, the reflective area 311 may be embodied as a gradation sticker. Further, the position detecting member 310 may be embodied as a reflective sticker in which gradation is formed on an outer face thereof.

Thus, a position of the circuit breaker body 200 is linearly displaced inside the cradle 100 while the circuit breaker body 200 retracts into or extends from the receiving space.

In this regard, the optical sensor 320 fixed to one position has a light-emitter and a light-receiver.

The light-emitter irradiates light to the reflective area 311 as the gradation area. Then, the light reflected from the reflective area 311 is received by the light-receiver. An amount of the reflected light is measured by the light-receiver.

For example, the reflective area 311 has a predefined length and is embodied as a gradation area. Thus, the amount of reflected light therefrom may vary based on a position of the reflective area.

Accordingly, the reflective area 311 may be implemented such that the amount of light as reflected therefrom gradually increases or decreases in a direction from one end of the reflective area 311 to the other end thereof.

As a result, the position detecting member 310 is displaced simultaneously with the movement of the guide plate 210 onto which the moving circuit breaker body 200 is seated. Thus, an amount of reflected light from a predefined position of the reflective area 311 may be measured by the optical sensor, and a displaced position of the circuit breaker body 200 may be easily detected by the optical sensor, based on the measured amount of reflected light.

Further, the device according to the present disclosure may detect position information about three positions of the circuit breaker body 200, that is, the disconnect position, the test position, and the connect position, and may linearly detect a displaced position of the body within a predefined movement range, thereby detecting an accurate displaced position of the circuit breaker body 200.

In one example, referring to FIG. 6, the position detecting member 310 according to the present disclosure is attached to the predefined area of the side face of the guide plate 210 exposed to the guide hole 110. The position detecting member 310 has the reflective area 312 in which an amount of light reflected therefrom varies based on along the length direction thereof.

The position detecting member 310 is attached to the installation area of the side face of the guide plate 210.

The optical sensor 320 is installed in the cradle 100 so as to be disposed in the vicinity of the guide hole 110. The optical sensor 320 emits light to the reflective area 312 of the position detecting member 310 and measures the amount of reflected light therefrom, and measures the displaced position of the guide plate 210 on which the circuit breaker body 200 is mounted.

In this regard, the reflective area 312 may be embodied as an inclined member with an inclined face 312a inclined in a direction from one end to the other end.

Thus, while the circuit breaker body 200 retracts into or extends from the receiving space while being seated on the guide plate 210, the position of the guide plate 210 is linearly displaced inside the cradle 100.

In this regard, the optical sensor 320 fixed to one position has the light-emitter and the light-receiver.

The light-emitter irradiates light to the moving inclined face 312a. Then, the light reflected from the inclined face 312a is received by the light-receiver and the amount of reflected light is measured by the light-receiver.

For example, the inclined member has a predefined length and has the inclined face 312a. Thus, the amount of reflected light therefrom varies based on a position on the reflective area 312.

Therefore, the inclined member may be implemented such that the amount of light reflected from the inclined face 312a gradually increases or decreases in a direction from one end of the inclined face 312a to the other end thereof.

The position detecting member 310 is displaced simultaneously with the movement of the guide plate 210 onto which the moving circuit breaker body 200 is seated. Thus, an amount of reflected light from a predefined position of the reflective area 311 may be measured by the optical sensor, and a displaced position of the circuit breaker body 200 may be easily detected by the optical sensor, based on the measured amount of reflected light.

Further, the device according to the present disclosure may detect position information about three positions of the circuit breaker body 200, that is, the disconnect position, the test position, and the connect position, and may linearly detect a displaced position of the body within a predefined movement range, thereby detecting an accurate displaced position of the circuit breaker body 200.

When the inclined member is used, a distance to the inclined face 312a may be measured by the optical sensor, and the displaced position of the circuit breaker may be detected by the optical sensor, based on this measured distance value.

Figure 7:
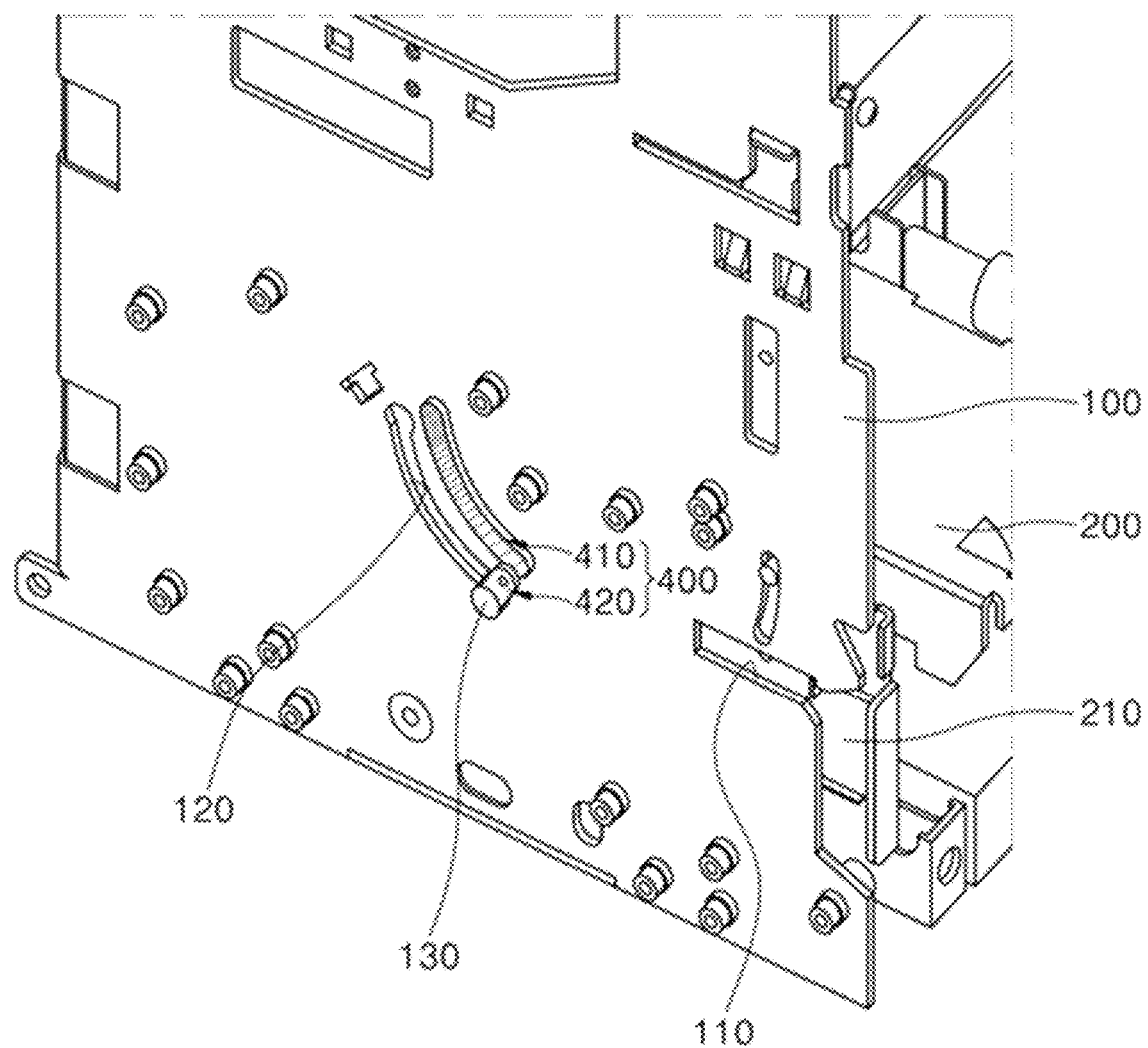
FIG. 7 is a perspective view showing another embodiment of a position detector according to the present disclosure.
Figure 8:
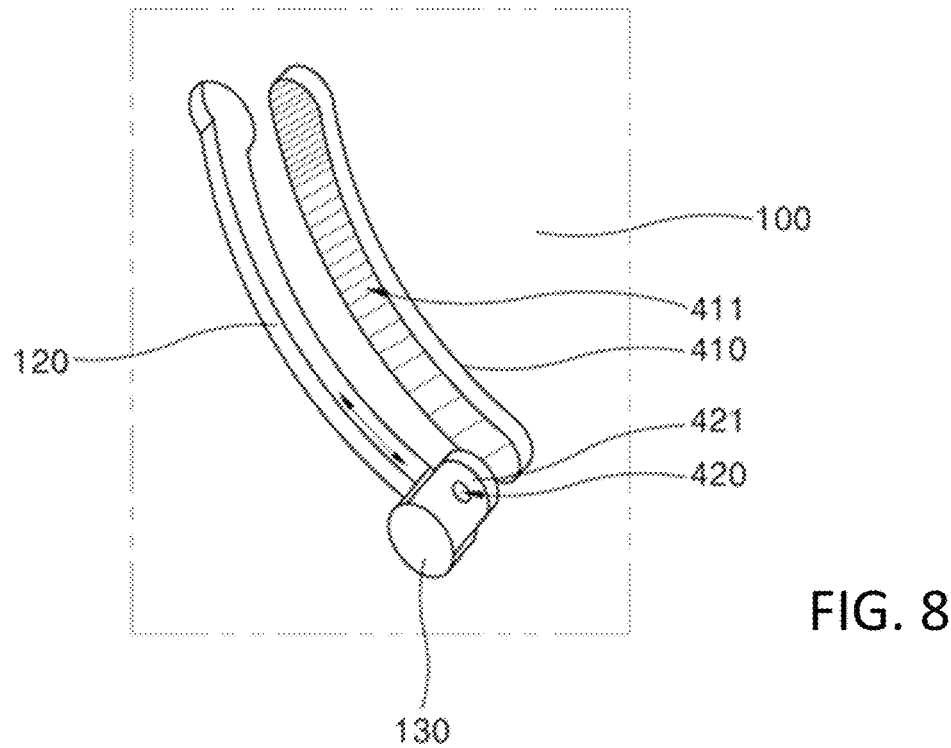
FIG. 8 is a view showing a first example of a position detecting member in another embodiment of a position detector according to the present disclosure.
Figure 9:
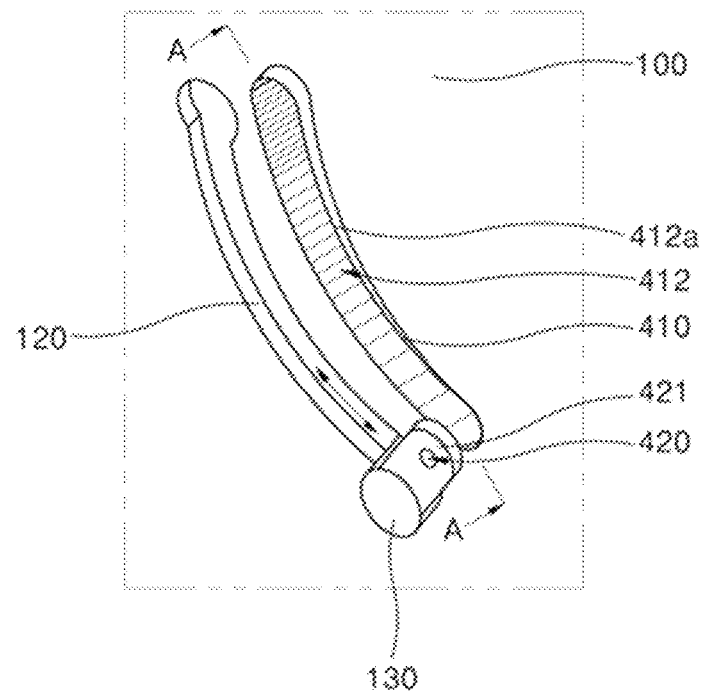
FIG. 9 is a diagram showing a second example of a position detecting member according to the present disclosure.
Figure 10:
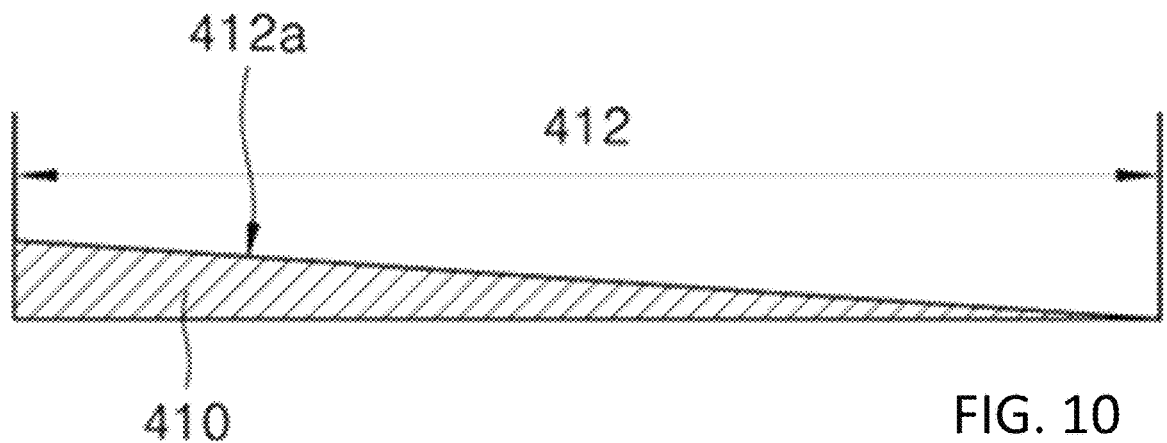
FIG. 10 is a cross-sectional view taken along a line A-A of FIG. 9.

FIG. 7 is a perspective view showing another embodiment of a position detector according to the present disclosure. FIG. 8 is a diagram showing a first example of a position detecting member in another example of a position detector according to the present disclosure. FIG. 9 is a diagram showing a second example of a position detecting member according to the present disclosure. FIG. 10 is a cross-sectional view taken along a line A-A of FIG. 9.

Referring to FIG. 7 and FIG. 8, a curved hole 120 having a set curvature is defined in a side face of the cradle 100 according to the present disclosure.

A contact pin 130 disposed inside the cradle 100 and connected to a link (not shown) connected to the circuit breaker body 200 is inserted into and protrudes from the curved hole 120 and is movable along the curved hole 120. Accordingly, movement of the contact pin 130 is associated with the movement of the circuit breaker body 200.

The contact pin 130 is displaced along the curved hole 120 as the circuit breaker body 200 retracts into or extends from the receiving space.

A position detector 400 includes a position detecting member 410 having a predetermined curvature along a length direction of the curved hole 120, and disposed adjacent to the curved hole 120, and having a reflective area 411 in which an amount of light reflected therefrom varies in a length direction thereof, and an optical sensor 420 installed on the contact pin 130. The optical sensor 420 emits light to the reflective area 411 of the position detecting member 410 and measures an amount of reflected light therefrom and measures a displaced position of the circuit breaker body 200 based on the measured amount.

The position detecting member 410 is installed on an outer face of the cradle 100 and along a curvature of the curved hole 120 and in an area adjacent to the curved hole 120.

The optical sensor 400 is installed on the contact pin 130. The optical sensor 400 has a light-emitter and a light-receiver. The optical sensor 400 is fixed at a position of the contact pin 130 set such that the sensor 400 is capable of emitting light to and receiving light from the reflective area 411.

A bracket 421 extending laterally is installed on an upper end of the contact pin 130. The bracket 421 may be exposed to the curved hole 120. The optical sensor 420 is fixedly installed on the bracket 421. The optical sensor 420 may be exposed to the curved hole 120.

The optical sensor 420 may emit light to the reflective area 411 of the position detecting member 410 and may measure the amount of reflected light therefrom, and may determine the displaced position of the circuit breaker body 200 based on the measured amount.

In this regard, the reflective area 411 may be embodied as a gradation sticker. Further, the position detecting member 410 may be embodied as a reflective sticker in which gradation is formed on an outer face thereof. The sticker is a curved sticker.

Thus, the position of the circuit breaker body 200 is linearly displaced inside the cradle 100 while the circuit breaker body 200 retracts into or extends from the receiving space.

At this time, the contact pin 130 is displaced along the curved hole 120. In this regard, the optical sensor 400 installed on the contact pin 130 has the light-emitter and the light-receiver.

The light-emitter irradiates light to the reflective area 411 as a moving gradation area. Then, the light reflected from the reflective area 411 is received by the light-receiver and the amount of reflected light therefrom is measured thereby.

For example, the reflective area 411 has a predefined length and is embodied as a gradation area. Thus, the amount of reflected light therefrom may vary based on a position of the reflective area 411.

Accordingly, the reflective area 411 may be implemented such that the amount of light as reflected therefrom gradually increases or decreases in a direction from one end of the reflective area 411 to the other end thereof.

Therefore, the optical sensor 420 is attached to the contact pin 130 and is displaced along therewith, such that the sensor 420 measures the amount of reflected light from a predefined position of the reflective area 411 during the movement of the sensor 420. Thus, the displaced position of the circuit breaker body 200 may be easily detected by the sensor based on the measured amount of the reflected light.

Further, the device according to the present disclosure may detect position information about three positions of the circuit breaker body 200, that is, the disconnect position, the test position, and the connect position, and may linearly detect a displaced position of the body within a predefined movement range, thereby detecting an accurate displaced position of the circuit breaker body 200.

In one example, referring to FIG. 9 and FIG. 10, the position detecting member 410 according to the present disclosure is installed in the area adjacent to the curved hole 120. The position detecting member 410 has the same curvature as that of the curved hole 120.

The optical sensor 400 is installed on the contact pin 130, and emits light to the position detecting member 410 and measures the amount of reflected light therefrom and measures the displaced position of the circuit breaker body 200 based on the measured amount.

In this regard, the reflective area 412 may be embodied as an inclined member with an inclined face 412a inclined in a direction from one end to the other end.

Thus, while the circuit breaker body 200 retracts into or extends from the receiving space while being seated on the guide plate 210, the position of the guide plate 210 is linearly displaced inside the cradle 100.

In this regard, the optical sensor 320 fixed to one position has the light-emitter and the light-receiver.

The light-emitter irradiates light to the moving inclined face 412a. Then, the light reflected from the inclined face 412a is received by the light-receiver and the amount of reflected light is measured by the light-receiver.

For example, the inclined member has a predefined length and has the inclined face 412a. Thus, the amount of reflected light therefrom varies based on a position on the reflective area 412.

Therefore, the inclined member may be implemented such that the amount of light reflected from the inclined face 412a gradually increases or decreases in a direction from one end of the inclined face 412a to the other end thereof.

The position detecting member 410 is displaced simultaneously with the movement of the guide plate 210 onto which the moving circuit breaker body 200 is seated. Thus, an amount of reflected light from a predefined position of the reflective area 311 may be measured by the optical sensor, and a displaced position of the circuit breaker body 200 may be easily detected by the optical sensor, based on the measured amount of reflected light.

Further, the device according to the present disclosure may detect position information about three positions of the circuit breaker body 200, that is, the disconnect position, the test position, and the connect position, and may linearly detect a displaced position of the body within a predefined movement range, thereby detecting an accurate displaced position of the circuit breaker body 200.

When the inclined member is used, the distance to the inclined face 412a may be measured by the optical sensor, and the displaced position of the circuit breaker may be detected by the optical sensor, based on this measured distance value.

Figure 11:
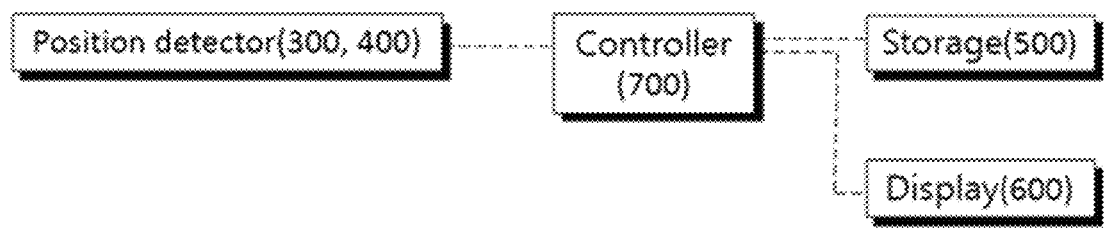
FIG. 11 illustrates a system for monitoring extending and retracting motions according to the present disclosure.

FIG. 11 illustrates a system for monitoring extending and retracting motions according to the present disclosure.

Referring to FIG. 11, a system for monitoring extending and retracting motions according to the present disclosure includes a device for detecting the above-described extended and retracted positions.

The system for monitoring the extending and retracting motions includes a storage 500 configured to receive the displaced position of the circuit breaker body 200 as linearly detected using the position detector 300 or 400, and to store the displaced position therein; a display 600 that externally displays the stored displaced position of the circuit breaker body 200; and a controller 700 that controls the display 600 to display the three preset positions and the stored displaced position of the circuit breaker body 200 in an overlapping manner with each other.

As described above, the position detector 300 or 400 according to the present disclosure may transmit information about the displaced position of the circuit breaker body 200 to the storage 500 while the circuit breaker body 200 is being drawn into or withdrawn out of the receiving space of the cradle 100.

The storage 500 stores the displaced position information of the moving circuit breaker body 200 in real time. The display 600 visually displays the displaced position or the displaced position information stored in the storage.

Accordingly, an operator may visually identify the displaced position of the circuit breaker body 200 inside the cradle 100.

Further, according to the present disclosure, the controller 700 controls the display 600 to display the three preset positions and the stored displaced position of the circuit breaker body 200 in an overlapping manner with each other so that the operator may identify in real time whether the circuit breaker body is accurately positioned at each of the three set positions.

In this regard, when each of the three set positions and an actual displaced position of the circuit breaker body 200 do not coincide with each other, the operator may use a device such as a handle to forcibly correct the position of the circuit breaker body 200, or may forcibly move the circuit breaker body 200 using a separate movement device to correct the position thereof.

Accordingly, the device according to the present disclosure linearly detects the position of the circuit breaker body 200 which is displaced inside the cradle 100. The system may allow the operator to identify whether the circuit breaker body 200 is positioned at each of the preset operating positions and to correct a position mismatch.

The specific embodiments regarding the present disclosure have been described above. However, it is obvious that various implementation modifications may be made as long as each thereof does not deviate from the scope of the present disclosure.

Therefore, the scope of the present disclosure should not be limited to the described embodiments and should be defined by the claims as described below as well as equivalents thereto.

That is, it should be understood that the above-described embodiments are not restrictive but illustrative in all respects, and the scope of the present disclosure is indicated by the claims to be described later rather than the detailed descriptions. Any changes or modifications derived from the meaning and scope of the claims and their equivalents should be construed as being included in the scope of the present disclosure.

What is claimed is:

1. A device for detecting extended and retracted positions for a power device, the detecting device comprising:
    a cradle having one open side, and having a placement space defined therein;
    a guide plate movably disposed in the placement space, wherein a power device body is seated on the guide plate; and
    a position detector configured to linearly detect a displaced position of the power device body while the power device body seated on the guide plate retracts into or extends from the cradle, the position detector comprising:

a position detecting member attached to a predefined area of a side face of the cradle, wherein the position detecting member has a reflective area, wherein an amount of light reflected from the reflective area varies along a longitudinal direction thereof; and
an optical sensor installed in the cradle, wherein the optical sensor is configured to emit light to the reflective area of the position detecting member, and measure an amount of light reflected therefrom, and measure the displaced position of the power device body based on the measured amount.

2. The device of claim 1, wherein:
the position detector is in communication with a controller, which is in communication with a storage and a display;
the storage is configured for receiving the linearly-detected displaced position of the power device body from the position detector and storing the displaced position therein;
the display is configured for displaying the stored displaced position of the power device body to an outside; and
the controller is configured to control the display to display a preset position and the stored displaced position of the power device body in an overlapping manner with each other.

3. The device of claim 1, wherein the reflective area is embodied as at least one of:
a gradation sticker; or
an inclined member having an inclined face gradually upwardly or downwardly inclined in a direction from one end to the other end of the reflective area.

4. The device of claim 1, wherein:
a guide hole is defined in a side face of the cradle, wherein the guide hole has a predefined length and extends along a horizontal direction;
the position detecting member is attached to a predefined area of a side face of the cradle exposed to the guide hole; and
the optical sensor is installed in the cradle so as to be disposed adjacent to the guide hole.

5. The device of claim 1, wherein:
a curved hole having a preset curvature is defined in a side face of the cradle;
the position detecting member extends in a curved manner along a length direction of the curved hole and has a predetermined curvature, wherein the position detecting member is disposed in an area adjacent to the curved hole; and
the optical sensor is installed on the contact pin.

6. A device for detecting extended and retracted positions for a power device, the detecting device comprising:
a cradle having one open side, and having a placement space defined therein;
a guide plate movably disposed in the placement space, wherein a power device body is seated on the guide plate; and
a position detector configured to linearly detect a displaced position of the power device body while the power device body seated on the guide plate retracts into or extends from the cradle;
wherein a guide hole is defined in a side face of the cradle, wherein the guide hole has a predefined length and extends along a horizontal direction,
wherein the position detector includes:
a position detecting member attached to a predefined area of a side face of the cradle exposed to the guide hole, wherein the position detecting member has a reflective area, wherein an amount of light reflected from the reflective area varies along a longitudinal direction thereof; and
an optical sensor installed in the cradle so as to be disposed adjacent to the guide hole, wherein the optical sensor is configured to emit light to the reflective area of the position detecting member, and measure an amount of light reflected therefrom, and measure the displaced position of the power device body based on the measured amount.

7. The device of claim 6, wherein the reflective area is embodied as at least one of:
a gradation sticker; or
an inclined member having an inclined face gradually upwardly or downwardly inclined in a direction from one end to the other end of the reflective area.

8. A device for detecting extended and retracted positions for a power device, the detecting device comprising:
a cradle having one open side, and having a placement space defined therein;
a guide plate movably disposed in the placement space, wherein a power device body is seated on the guide plate; and
a position detector configured to linearly detect a displaced position of the power device body while the power device body seated on the guide plate retracts into or extends from the cradle;
wherein a curved hole having a preset curvature is defined in a side face of the cradle,
wherein a contact pin connected to a link disposed inside the cradle is positioned in the curved hole in a protruding manner therefrom, and the contact pin is movable along the curved hole,
wherein the contact pin is displaced along the curved hole while the power device body retracts into or extends from the cradle,
wherein the position detector includes:
a position detecting member extending in a curved manner along a length direction of the curved hole and having a predetermined curvature, wherein the position detecting member is disposed in an area adjacent to the curved hole, and has a reflective area, wherein an amount of light reflected from the reflective area varies along a longitudinal direction thereof; and
an optical sensor installed on the contact pin, wherein the optical sensor is configured to emit light to the reflective area of the position detecting member, and measure an amount of light reflected therefrom, and measure the displaced position of the power device body based on the measured amount.

9. The device of claim 8, wherein the reflective area is embodied as at least one of:
a gradation sticker; or
an inclined member having an inclined face gradually upwardly or downwardly inclined in a direction from one end to the other end of the reflective area.

* * * * *